United States Patent
Si et al.

(10) Patent No.: US 9,871,680 B2
(45) Date of Patent: Jan. 16, 2018

(54) PREAMBLE SEQUENCE SENDING AND RECEIVING METHOD AND APPARATUS, AND SYSTEM

(71) Applicant: Huawei Technologies Co., Ltd., Shenzhen (CN)

(72) Inventors: Xiaoshu Si, Wuhan (CN); Tao Ouyang, Wuhan (CN); Fan Wang, Wuhan (CN); Xingli Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/490,653

(22) Filed: Apr. 18, 2017

(65) Prior Publication Data

US 2017/0222842 A1 Aug. 3, 2017

Related U.S. Application Data

(63) Continuation of application No. PCT/CN2014/089791, filed on Oct. 29, 2014.

(51) Int. Cl.
 *H04L 25/08* (2006.01)
 *H04L 29/06* (2006.01)
 *H04L 25/02* (2006.01)
 *H04L 12/707* (2013.01)

(52) U.S. Cl.
 CPC .......... *H04L 25/085* (2013.01); *H04L 25/022* (2013.01); *H04L 69/22* (2013.01); *H04L 45/24* (2013.01)

(58) Field of Classification Search
 CPC ..... H04L 25/085; H04L 25/022; H04L 69/22; H04L 45/24
 See application file for complete search history.

(56) References Cited

U.S. PATENT DOCUMENTS

| | | | |
|---|---|---|---|
| 7,639,600 B1 * | 12/2009 | Lou | H04L 25/0204 370/208 |
| 7,738,355 B1 * | 6/2010 | Goh | H04L 25/022 370/204 |
| 7,826,342 B2 * | 11/2010 | Mueller-Weinfurtner | H04L 25/0204 370/208 |
| 2009/0163143 A1 * | 6/2009 | De Rore | H04L 25/0212 455/63.1 |
| 2009/0245399 A1 * | 10/2009 | Lee | H04L 27/2626 375/260 |
| 2014/0161030 A1 | 6/2014 | Lopez et al. | |

* cited by examiner

*Primary Examiner* — Freshteh N Aghdam
(74) *Attorney, Agent, or Firm* — Leydig, Voit & Mayer, Ltd.

(57) ABSTRACT

The present invention provides a preamble sequence sending and receiving method and apparatus, and a system. The preamble sequence sending method includes: generating, by a transmit end, a frequency offset estimation sequence, where the frequency offset estimation sequence includes N subsequences each with a length of M, N is a positive integer greater than or equal to 2, and M is a positive integer; generating, by the transmit end, a prefix and a suffix based on the frequency offset estimation sequence; adding, by the transmit end, the prefix and the suffix before and after the frequency offset estimation sequence respectively to form a preamble sequence, where the prefix and the suffix are used for canceling multipath interference; and adding, by the transmit end, the preamble sequence to a data packet and sending the data packet to a receive end.

11 Claims, 8 Drawing Sheets

PREAMBLE SEQUENCE SENDING AND RECEIVING METHOD AND APPARATUS, AND SYSTEM

CROSS-REFERENCE TO RELATED APPLICATIONS

This application is a continuation of International Application No. PCT/CN2014/089791, filed on Oct. 29, 2014, the disclosure of which is hereby incorporated by reference in its entirety.

TECHNICAL FIELD

The present invention relates to the field of communications technologies, and in particular, to a preamble sequence sending and receiving method and apparatus, and a system.

BACKGROUND

A data over cable service interface specification (DOCSIS) standard defines a protocol, and the protocol manages transmission of data in a hybrid fiber coaxial (HFC) network. FIG. 1 describes a higher layer architecture of a coaxial network. The coaxial network mainly includes two types of devices: a cable modem termination system (CMTS) and a cable modem (CM). The CM is a cheap device deployed on a user side on a large scale and used by a user for accessing a network, and the CMTS is an expensive and large device with a complex structure and deployed in a cable operator equipment room. A data link from the CMTS to the CM is referred to as a downlink, and a data link from the CM to the CMTS is referred to as an uplink. The following uses an uplink as an example for description.

Generally, data may be interfered by various noise signals after passing through a channel, and these interference signals may be mixed with received signals. To improve quality of the received signals, a receive end needs to perform a series of synchronization operations to compensate for the interference signals. Therefore, when the CM just accesses the HFC network, the CMTS needs to estimate and compensate for some physical-layer parameters, such as a symbol timing error, a carrier frequency error, and channel attenuation. FIG. 2 describes a structure of an uplink burst packet in a DOCSIS single carrier modulation system. The burst packet includes two parts: a known preamble sequence and load. The CMTS uses the preamble sequence to perform synchronization to complete estimation of the symbol timing error, estimation of the carrier frequency error, and the like. The load after the preamble sequence is useful data sent by the CM.

FIG. 3 describes a design manner of a preamble sequence used for frequency offset estimation in the prior art. The preamble sequence includes multiple repeated cycle subsequences, each with a length of M.

Generally, micro-reflection also exists on uplink and downlink channels, and may result in a multipath effect for an uplink transmission signal and a downlink transmission signal. However, a preamble sequence in the prior art has no anti-multipath interference performance. This causes great difficulties for a receive end to estimate a carrier frequency error, and an obtained frequency offset estimation value has a relatively large error.

SUMMARY

Embodiments of the present invention provide a preamble sequence sending and receiving method and apparatus, and a system, so as to resolve a prior-art problem that an operation for estimating a carrier frequency error by a receive end is complex and a frequency offset estimation value has a relatively large error because a preamble sequence has no anti-multipath interference performance.

According to a first aspect, an embodiment of the present invention provides a preamble sequence sending method, where the method includes:

generating, by a transmit end, a frequency offset estimation sequence, where the frequency offset estimation sequence includes N subsequences each with a length of M, N is a positive integer greater than or equal to 2, and M is a positive integer;

generating, by the transmit end, a prefix and a suffix based on the frequency offset estimation sequence;

adding, by the transmit end, the prefix and the suffix before and after the frequency offset estimation sequence respectively to form a preamble sequence, where the prefix and the suffix are used for canceling multipath interference; and adding, by the transmit end, the preamble sequence to a data packet and sending the data packet to a receive end.

With reference to the first aspect, in a first possible implementation manner of the first aspect, the generating, by a transmit end, a frequency offset estimation sequence includes:

generating, by the transmit end, a bit stream;

modulating, by the transmit end, the bit stream to a preset data modulation format, wherein the modulated bit stream is used as a basic subsequence, and a length of the basic subsequence is M;

replicating, by the transmit end, the basic subsequence to obtain a long sequence including N basic subsequences; and rotating, by the transmit end, each subsequence included in the long sequence by a phase of $\theta$ relative to a previous subsequence adjacent to the subsequence, to obtain the frequency offset estimation sequence, where $-\pi \leq \theta \leq \pi$.

With reference to the first aspect, in a second possible implementation manner of the first aspect, the generating, by the transmit end, a prefix and a suffix based on the frequency offset estimation sequence includes:

replicating, by the transmit end, last L1 element values included in the first subsequence of the frequency offset estimation sequence, and separately rotating the replicated L1 element values by a phase of $-\theta$ to generate the prefix; and replicating, by the transmit end, first L2 element values included in the last subsequence of the frequency offset estimation sequence, and separately rotating the replicated L2 element values by a phase of $\theta$ to generate the suffix; where L1 and L2 are set by the transmit end according to a channel multipath feature, and L1 and L2 are integers not greater than M.

With reference to the second possible implementation manner of the first aspect, in a third possible implementation manner of the first aspect, the adding, by the transmit end, the prefix and the suffix before and after the frequency offset estimation sequence respectively includes:

adding, by the transmit end, the prefix before the first subsequence of the frequency offset estimation sequence; and adding, by the transmit end, the suffix after the last subsequence of the frequency offset estimation sequence.

According to a second aspect, an embodiment of the present invention provides a preamble sequence receiving method, where the method includes:

receiving, by a receive end, a data packet;

extracting, by the receive end, a preamble sequence from the data packet, where the preamble sequence includes a prefix, a frequency offset estimation sequence, and a suffix in order, the prefix and the suffix are used for canceling multipath interference, the frequency offset estimation sequence includes N subsequences each with a length of M, N is a positive integer greater than or equal to 2, and M is a positive integer; and finding, by the receive end, the frequency offset estimation sequence in the preamble sequence according to a length of the prefix.

With reference to the second aspect, in a first possible implementation manner of the second aspect, after the finding, by the receive end, the frequency offset estimation sequence in the preamble sequence according to a length of the prefix, the method further includes:

delaying, by the receive end, each subsequence included in the frequency offset estimation sequence by a length of K subsequences to obtain a new sequence, where K is a positive integer less than N;

performing, by the receive end, conjugation on the new sequence to obtain a processing sequence;

multiplying, by the receive end, an element value in a subsequence in the processed sequence by a corresponding element value in a subsequence in the frequency offset estimation sequence to obtain (N−K)*M complex numbers;

calculating, by the receive end, a sum of the (N−K)*M complex numbers;

obtaining, by the receive end, a phase of the sum to obtain a phase value; and dividing, by the receive end, the phase value by M to obtain a frequency offset estimation value.

With reference to the second aspect, in a second possible implementation manner of the second aspect, each subsequence included in the frequency offset estimation sequence is rotated by a phase of θ relative to a previous subsequence adjacent to the subsequence, and $-\pi \leq \theta \leq \pi$.

With reference to the second possible implementation manner of the second aspect, in a third possible implementation manner of the second aspect, when θ≠0, before the dividing, by the receive end, the phase value by M, the receive end performs phase compensation on the phase value.

With reference to the third possible implementation manner of the second aspect, in a fourth possible implementation manner of the second aspect, the performing, by the receive end, phase compensation on the phase value includes:

rotating, by the receive end, the phase value by a phase of φ, where φ is related to θ.

According to a third aspect, an embodiment of the present invention provides a preamble sequence sending apparatus, where the apparatus includes:

a first generation unit, configured to generate a frequency offset estimation sequence, where the frequency offset estimation sequence includes N subsequences each with a length of M, N is a positive integer greater than or equal to 2, and M is a positive integer;

a second generation unit, configured to generate a prefix and a suffix based on the frequency offset estimation sequence;

an adding unit, configured to add the prefix and the suffix before and after the frequency offset estimation sequence respectively to form a preamble sequence, where the prefix and the suffix are used for canceling multipath interference; and a sending unit, configured to add the preamble sequence to a data packet and send the data packet to a receive end.

With reference to the third aspect, in a first possible implementation manner of the third aspect, the first generation unit is specifically configured to:

generate a bit stream;

modulate the bit stream to a preset data modulation format, wherein the modulated bit stream is used as a basic subsequence, and a length of the basic subsequence is M;

replicate the basic subsequence to obtain a long sequence including N basic subsequences; and rotate each subsequence included in the long sequence by a phase of θ relative to a previous subsequence adjacent to the subsequence, to obtain the frequency offset estimation sequence, where $-\pi \leq \theta \leq \pi$.

With reference to the third aspect, in a second possible implementation manner of the third aspect, the second generation unit is specifically configured to:

replicate last L1 element values included in the first subsequence of the frequency offset estimation sequence, and separately rotate the replicated L1 element values by a phase of −θ to generate the prefix; and replicate first L2 element values included in the last subsequence of the frequency offset estimation sequence, and separately rotate the replicated L2 element values by a phase of θ to generate the suffix; where L1 and L2 are set by the second generation unit according to a channel multipath feature, and L1 and L2 are integers not greater than M.

With reference to the second possible implementation manner of the third aspect, in a third possible implementation manner of the third aspect, the adding unit is specifically configured to:

add the prefix before the first subsequence of the frequency offset estimation sequence; and add the suffix after the last subsequence of the frequency offset estimation sequence.

According to a fourth aspect, an embodiment of the present invention provides a preamble sequence receiving apparatus, where the apparatus includes:

a receiving unit, configured to receive a data packet;

an extraction unit, configured to extract a preamble sequence from the data packet, where the preamble sequence includes a prefix, a frequency offset estimation sequence, and a suffix in order, the prefix and the suffix are used for canceling multipath interference, the frequency offset estimation sequence includes N subsequences each with a length of M, N is a positive integer greater than or equal to 2, and M is a positive integer; and a positioning unit, configured to find the frequency offset estimation sequence in the preamble sequence according to a length of the prefix.

With reference to the fourth aspect, in a first possible implementation manner of the fourth aspect, the apparatus further includes:

a frequency offset estimation unit, configured to delay each subsequence included in the frequency offset estimation sequence by a length of K subsequences to obtain a new sequence, where K is a positive integer less than N; perform conjugation on the new sequence to obtain a processing sequence; multiply an element value in a subsequence in the processed sequence by a corresponding element value in a subsequence in the frequency offset estimation sequence to obtain (N−K)*M complex numbers; calculate a sum of the (N−K)*M complex numbers; obtain a phase of the sum to obtain a phase value; and divide the phase value by M to obtain a frequency offset estimation value.

With reference to the fourth aspect, in a second possible implementation manner of the fourth aspect, each subsequence included in the frequency offset estimation sequence is rotated by a phase of θ relative to a previous subsequence adjacent to the subsequence, and $-\pi \le \theta \le \pi$.

With reference to the second possible implementation manner of the fourth aspect, in a third possible implementation manner of the fourth aspect, the apparatus further includes: a phase compensation unit, configured to: when θ≠0, before the frequency offset estimation unit divides the phase value by M, perform phase compensation on the phase value.

With reference to the third possible implementation manner of the fourth aspect, in a fourth possible implementation manner of the fourth aspect, the phase compensation unit is specifically configured:

rotate the phase value by a phase of φ, where φ is related to θ.

According to a fifth aspect, an embodiment of the present invention provides a preamble sequence processing system that includes the sending apparatus according to any one of the possible implementation manners in the third aspect and the receiving apparatus according to any one of the possible implementation manners in the fourth aspect, where the sending apparatus is connected to the receiving apparatus.

According to the preamble sequence sending and receiving method and apparatus, and the system provided in the embodiments of the present invention, a prefix and a suffix are added to a frequency offset estimation sequence at a transmit end, so as to provide a frequency offset estimation sequence with higher anti-multipath interference performance.

DESCRIPTION OF EMBODIMENTS

Embodiments of the present invention provide a preamble sequence sending and receiving method and apparatus, and a system that are applied to a DOCSIS single carrier modulation system. A prefix and a suffix are added to a frequency offset estimation sequence at a transmit end, so as to improve performance of anti-multipath interference of the frequency offset estimation sequence, and reduce multipath channel impact on frequency offset estimation.

The technical solutions in the embodiments of the present invention are described in the following with reference to the accompany drawings and the embodiments in this specification.

Figure 1:
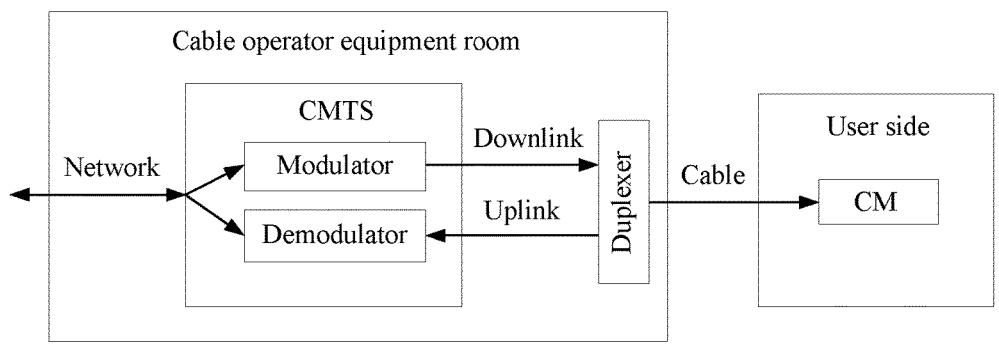
FIG. 1 is a schematic diagram of a higher layer architecture of a coaxial network in the prior art.
Figure 2:
FIG. 2 is a schematic structural diagram of an uplink burst packet in a DOCSIS single carrier modulation system in the prior art.
Figure 3:
FIG. 3 is a schematic diagram of a design manner of a preamble sequence used for frequency offset estimation in the prior art.
Figure 4:
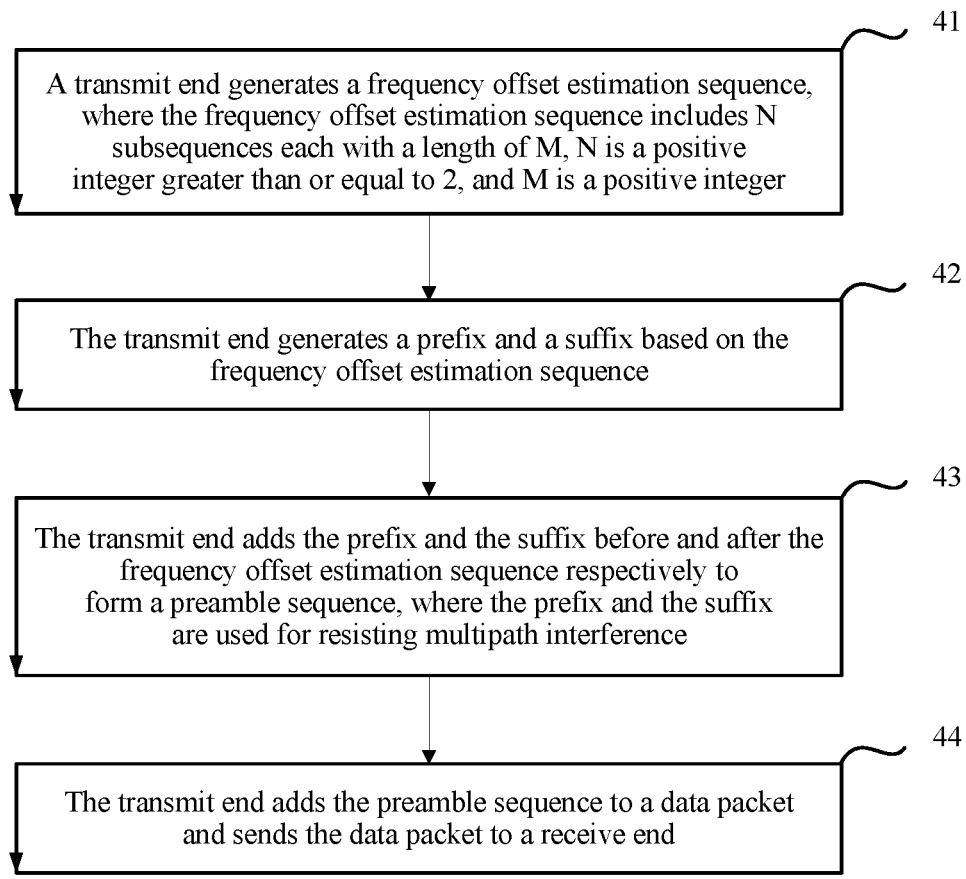
FIG. 4 is an implementation flowchart of a preamble sequence sending method according to an embodiment of the present invention.

An embodiment of the present invention provides a preamble sequence sending method. As shown in FIG. 4, an implementation procedure of the method is as follows:

Step 41: A transmit end generates a frequency offset estimation sequence, where the frequency offset estimation sequence includes N subsequences each with a length of M, N is a positive integer greater than or equal to 2, and M is a positive integer.

In this embodiment of the present invention, the transmit end may be a CMTS, or may be a CM.

Specifically, the transmit end generates the frequency offset estimation sequence in the following process: The transmit end first generates a bit stream, and the bit stream may be randomly designed, or may be specially designed, for example, in a form of {1, −1, 1, 1 . . . }. Then the transmit end modulates the bit stream to a preset data modulation format, such as binary phase shift keying (BPSK) or quadrature phase shift keying (QPSK). The bit stream is used as a basic subsequence, and a length of the basic subsequence is M. The transmit end replicates the basic subsequence to obtain a long sequence including N basic subsequences. Next, the transmit end rotates each subsequence included in the long sequence by a phase of θ relative to a previous subsequence adjacent to the subsequence, to obtain the frequency offset estimation sequence, where $-\pi \le \theta \le \pi$.

When θ=0, the frequency offset estimation sequence is a cycle sequence; when θ≠0, the frequency offset estimation sequence is a rotation sequence, and θ is a rotation angle of the frequency offset estimation sequence. An absolute value of θ cannot exceed π, so as to improve frequency offset estimation accuracy, and avoid an erroneous result when a receive end subsequently performs frequency offset estimation.

A principle that the frequency offset estimation sequence can cancel multipath channel interference is described as follows:

It is assumed that a multipath channel is $h_n$, $n=-L1, -L1+1, \ldots 0, \ldots, L2$, useful data transmitted on the multipath channel is $a_n$, a frequency offset existed on the multipath channel is $\Delta f$, a sampling rate is $f_s$, and an initial phase is $\theta_0$. Therefore, a received signal $x[n]$ may be expressed as follows:

$$x[n] = (a_n * h_n)e^{j(2\pi*\Delta f*n/f_s + \theta_0)} = B_1[n]e^{j(2\pi*\Delta f*n/f_s + \theta_0)}.$$

A received signal $x[n+M]$, M element values away from $x[n]$, may be expressed as follows:

$$x[n+M] = (a_{n+M} * h_n)e^{j(2\pi*\Delta f*(n+M)/f_s + \theta_0)} = B_2[n]e^{j(2\pi*\Delta f*(n+M)/f_s + \theta_0)}.$$

A result $y[n]$ obtained by conjugate-multiplying the two signals may be expressed as follows:

$$y[n]=x[n+M]x^*[n]=B_2[n]B_1^*[n]e^{j(2\pi*\Delta f*M/f_s)}.$$

Both the sampling rate $f_s$ and a sequence cycle M are known constants, and the frequency offset $\Delta f$ is unknown and to be calculated.

If the frequency offset estimation sequence is a cycle sequence with a cycle of M, $a_{n+M}=a_n$ and $B_2[n]=B_1[n]$. Because a result obtained by conjugate-multiplying two same element values is definitely a real number, a product of $B_2[n]B_1^*[n]$ is a real number, and a phase introduced by the channel $h_n$ may be canceled. A frequency offset value can be calculated by using a phase of $y[n]$ only.

If the frequency offset estimation sequence is a rotation sequence with a rotation angle of $\theta$, $a_{n+M}=a_n e^{j\theta}$ and a product of $B_2[n]B_1^*[n]$ is a fixed complex number with a phase of $\theta$. After a phase of $y[n]$ is calculated, a value of $\theta$ is canceled, so as to obtain a real phase and calculate a frequency offset value.

In addition, when a cycle sequence is replaced by a rotation sequence, not only multipath channel interference can be canceled, but also an estimation range of the frequency offset estimation sequence can be freely adjusted by setting a rotation angle of $\theta$. Therefore, compared with the cycle sequence, the rotation sequence has a wider estimation range.

A principle that an estimation range of a frequency offset may be freely adjusted in a rotation sequence is described as follows:

It is assumed that a rotation angle of a rotation sequence is $\theta$, after an angle of the result $y[n]=x[n+M]x^*[n]=B_2[n]B_1^*[n]e^{j(2\pi*\Delta f*M/f_s+\theta)}$ obtained by conjugate-multiplying $x[n]$ and $x[n+M]$ is obtained, there is the following relationship:

$$-\pi \leq 2\pi*\Delta f*M/f_s + \theta \leq \pi,$$

$$\Rightarrow \frac{(-\pi-\theta)f_s}{2\pi M} \leq \Delta f \leq \frac{(\pi-\theta)f_s}{2\pi M}.$$

For a common system, the sampling rate $f_s$ is determinate. For a maximum frequency offset $\Delta f_{max}$ in the system, a length of a sequence M is limited.

For a determinate length of a sequence M, if $\theta$ is equal to zero, the sequence is a cycle sequence, and an estimation range of the frequency offset is as follows:

$$\frac{-f_s}{2M} \leq \Delta f \leq \frac{f_s}{2M}.$$

If $\theta$ is equal to $\pi$, that is, the sequence is a rotation sequence with a rotation angle of $\pi$, and an estimation range of the frequency offset is as follows:

$$\frac{-f_s}{M} \leq \Delta f \leq 0.$$

If $\theta$ is equal to $-\pi$, that is, the sequence is a rotation sequence with a rotation angle of $-\pi$, and an estimation range of the frequency offset is as follows:

$$0 \leq \Delta f \leq \frac{f_s}{M}.$$

It may be learned that, if a maximum value of a frequency offset that can be estimated is $\Delta f_{max}$, when the frequency offset value is calculated by using the cycle sequence, an estimation range is $-\Delta f_{max}$ to $\Delta f_{max}$; when the frequency offset value is calculated by using the rotation frequency, a minimum estimation range is $-2\Delta f_{max}$ to 0, and a maximum estimation range is 0 to $2\Delta f_{max}$. Considering that a frequency offset of an actual system is relatively fixed, either positive or negative, when a rotation sequence is used, an estimation range of the rotation sequence may be adjusted flexibly according to a characteristic of the system, for example, the system has a positive frequency offset range or a negative frequency offset range. For example, when an actual frequency offset of a system is $3/2\Delta f_{max}$, and a frequency offset value is calculated by using a rotation sequence, according to a characteristic that the system has a positive frequency offset range, an estimation range may be adjusted to 0 to $2\Delta f_{max}$, that is, the actual frequency offset of the system may be estimated accurately. However, when a cycle sequence is used to calculate a frequency offset value, a maximum frequency offset value can only be estimated as large as $\Delta f_{max}$. Apparently, with respect to a frequency offset estimation sequence of a same length, a rotation characteristic of the rotation sequence makes the rotation sequence have a wider estimation range and higher estimation accuracy than the cycle sequence.

It should be noted that, the foregoing characteristic of the rotation sequence does not depend on the technical solution of the present invention, and may be implemented in cooperation with another technical means or may be implemented separately. Both the implementation manners can freely adjust the estimation range of the frequency offset estimation sequence.

Step 42: The transmit end generates a prefix and a suffix based on the frequency offset estimation sequence.

Specifically, the transmit end generates the prefix and the suffix in the following process: The transmit end replicates last L1 element values included in the first subsequence of the frequency offset estimation sequence, and separately rotates the replicated L1 element values by a phase of $-\theta$ to generate the prefix. The transmit end replicates first L2 element values included in the last subsequence of the frequency offset estimation sequence, and separately rotates the replicated L2 element values by a phase of θ to generate the suffix. L1 and L2 are set by the transmit end according to a channel multipath feature, and L1 and L2 are integers not greater than M.

Step 43: The transmit end adds the prefix and the suffix before and after the frequency offset estimation sequence respectively to form a preamble sequence, where the prefix and the suffix are used for canceling multipath interference.

Specifically, the transmit end adds the prefix and the suffix before and after the frequency offset estimation sequence respectively, that is, adds the prefix before the first subsequence of the frequency offset estimation sequence and adds the suffix after the last subsequence of the frequency offset estimation sequence.

Figure 5:
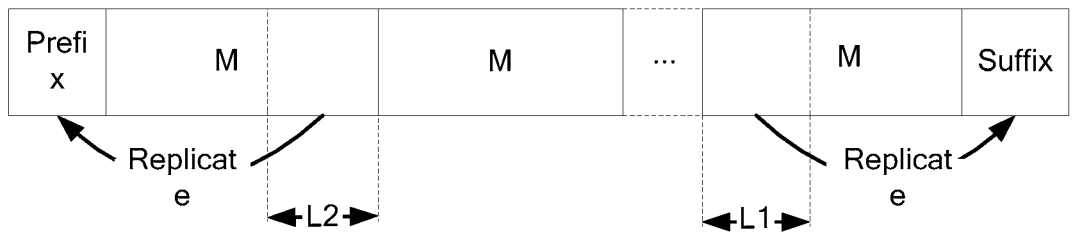
FIG. 5 is a schematic diagram of a design manner of a preamble sequence based on a cycle sequence according to an embodiment of the present invention.

FIG. 5 describes a design manner of a preamble sequence based on a cycle sequence.

Figure 6:
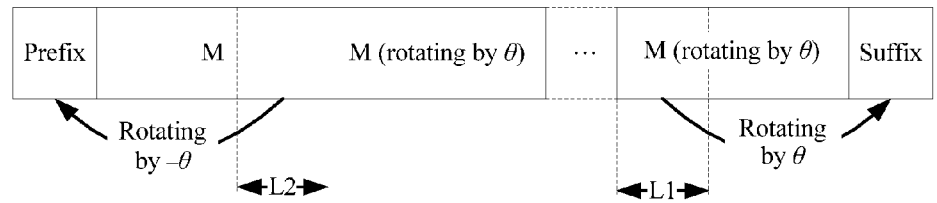
FIG. 6 is a schematic diagram of a design manner of a preamble sequence based on a rotation sequence according to an embodiment of the present invention.

FIG. 6 describes a design manner of a preamble sequence based on a rotation sequence.

The transmit end adds the prefix and the suffix at start and end locations of the frequency offset estimation sequence, so as to enhance performance of anti-multipath interference of the frequency offset estimation sequence, cancel a delay feature of a multipath channel, and improve frequency offset estimation accuracy.

A principle that the performance of anti-multipath interference of the frequency offset estimation sequence can be enhanced by adding the prefix and the suffix is described as follows:

Reference may be made to the foregoing description of the principle that the frequency offset estimation sequence can cancel multipath channel interference. Though in theory, the frequency offset estimation sequence can cancel the multipath channel interference, actually, due to existence of the multipath channel, $h_n$ is not a single value but a vector. Each element value of x[n] is related to L2 data before $a_n$ and L1 data after $a_n$. For a sequence with a cycle of M, not all y[n] calculated at all locations can cancel a phase of a channel $h_n$. The following convolution formula describes this relationship, and indicates that all the first L2 element values and the last L1 element values in $a_n$ are affected by another sequence:

$$B_1[n] = a_n * h_n = \sum_{k=-L1}^{L2} h_k a_{n-k}.$$

Figure 7:
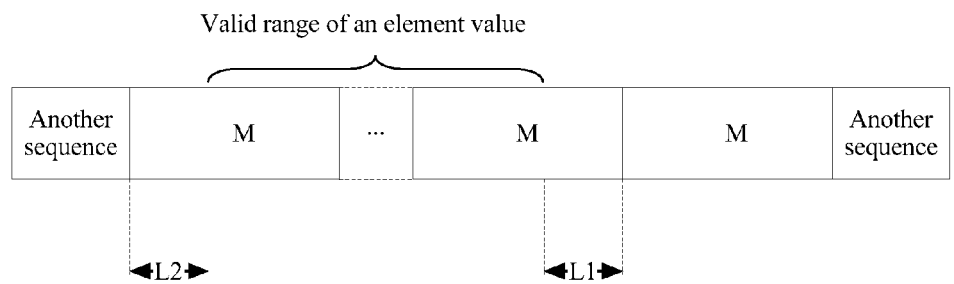
FIG. 7 is a valid range of an element value that can cancel multipath interference in the prior art.

FIG. 7 describes a valid range of an element value that can cancel multipath interference and that is in a frequency offset estimation sequence in the prior art, that is, a valid range of a value of n. The calculated y[n] can really cancel interference from a multipath channel only when n is within the range.

Figure 8:
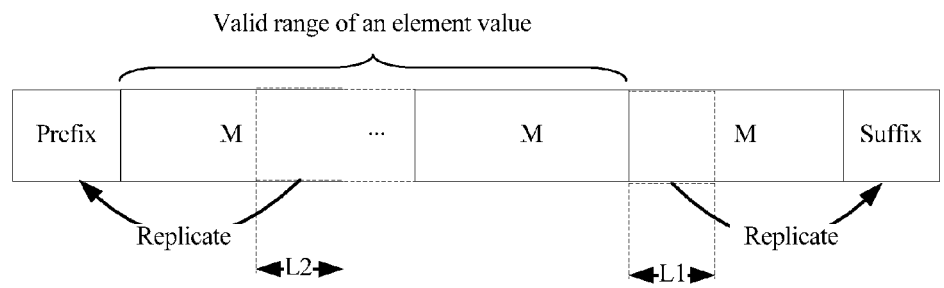
FIG. 8 is a valid range of an element value that can cancel multipath interference according to an embodiment of the present invention.

However, the added prefix and suffix in the technical solution of the present invention can cancel a phase of a channel $h_n$, so as to protect the frequency offset estimation sequence. FIG. 8 describes a valid range of an element value that can cancel multipath interference and that is in a frequency offset estimation sequence according to this embodiment of the present invention.

Step 44: The transmit end adds the preamble sequence to a data packet and sends the data packet to a receive end.

In the foregoing embodiment, a prefix and a suffix are added to a frequency offset estimation sequence at a transmit end, so as to provide a frequency offset estimation sequence with higher anti-multipath interference performance. The frequency offset estimation sequence may be a cycle sequence, or may be a rotation sequence. In particular, when the frequency offset estimation sequence is a rotation sequence, an estimation range of the frequency offset estimation sequence can be freely adjusted.

Figure 9:
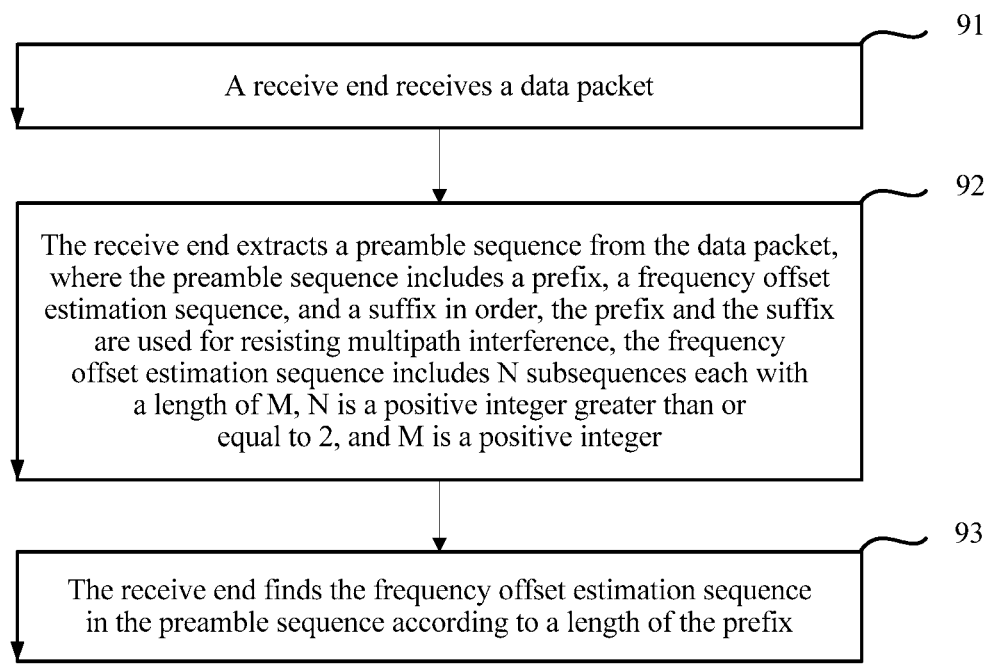
FIG. 9 is an implementation flowchart of a preamble sequence receiving method according to an embodiment of the present invention.

As shown in FIG. 9, an embodiment of the present invention further provides a preamble sequence receiving method, and an implementation procedure of the method is as follows:

Step 91: A receive end receives a data packet.

In this embodiment of the present invention, the receive end may be a CMTS, or may be a CM.

Step 92: The receive end extracts a preamble sequence from the data packet, where the preamble sequence includes a prefix, a frequency offset estimation sequence, and a suffix in order, the prefix and the suffix are used for canceling multipath interference, the frequency offset estimation sequence includes N subsequences each with a length of M, N is a positive integer greater than or equal to 2, and M is a positive integer.

Specifically, before extracting the preamble sequence, the receive end may search for a start location of the data packet by using a data monitor algorithm, and find a specific location of the preamble sequence according to a pre-designed data packet structure.

Step 93: The receive end finds the frequency offset estimation sequence in the preamble sequence according to a length of the prefix.

Because a transmit end may send related information of the preamble sequence to the receive end together with the preamble sequence, for the receive end, the length of the prefix, M, N, θ, and other information are known. The receive end may determine a location of the entire preamble sequence according to a detection algorithm, and find the frequency offset estimation sequence in the preamble sequence according to the length of the prefix. Each subsequence included in the frequency offset estimation sequence is rotated by a phase of θ relative to a previous subsequence adjacent to the subsequence, where $-\pi \leq \theta \leq \pi$.

Figure 10:
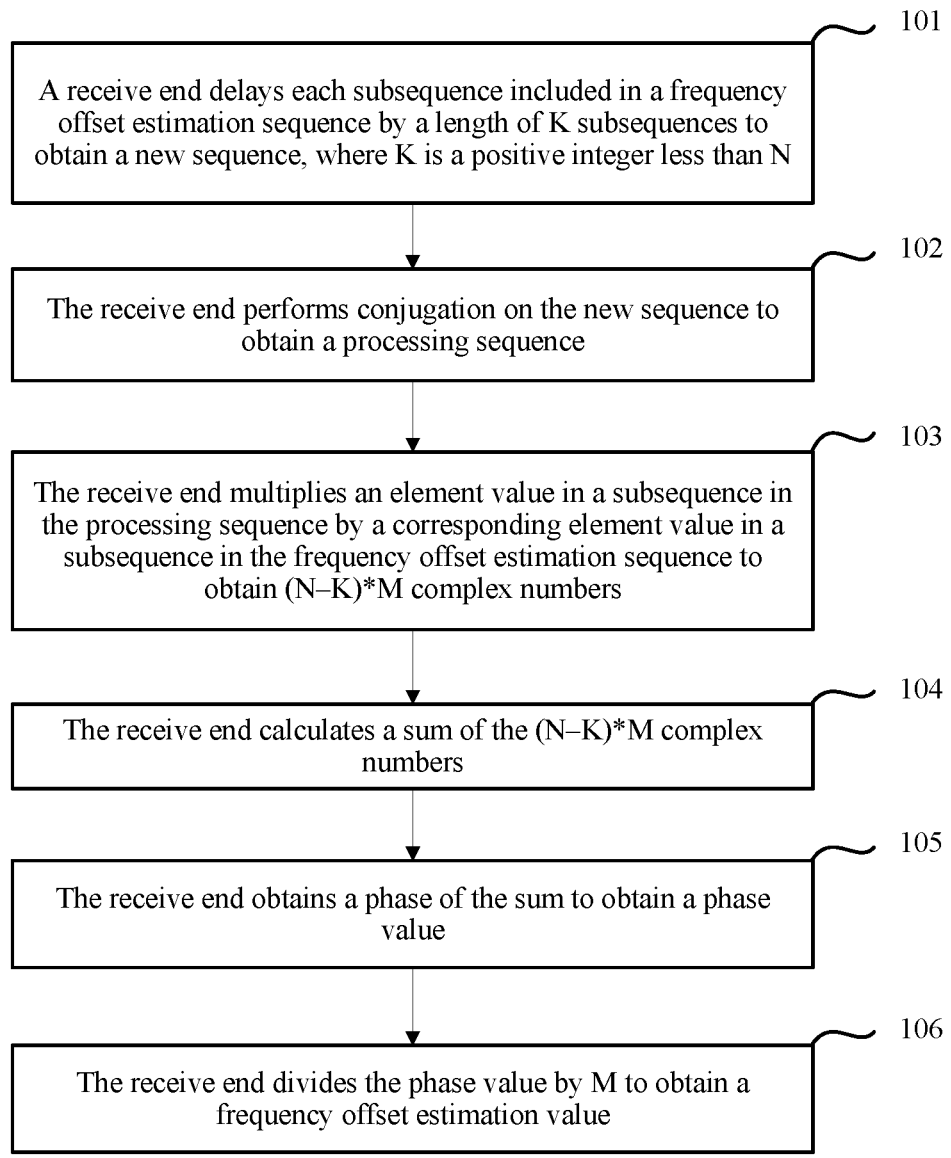
FIG. 10 is a flowchart of frequency offset estimation according to an embodiment of the present invention.

Further, after the frequency offset estimation sequence is found, the receive end may perform frequency offset estimation based on the frequency offset estimation sequence. As shown in FIG. 10, a specific procedure is as follows:

Step 101: The receive end delays each subsequence included in the frequency offset estimation sequence by a length of K subsequences to obtain a new sequence, where K is a positive integer less than N.

Step 102: The receive end performs conjugation on the new sequence to obtain a processing sequence.

Step 103: The receive end multiplies an element value in a subsequence in the processed sequence by a corresponding element value in a subsequence in the frequency offset estimation sequence to obtain (N−K)*M complex numbers.

Specifically, the receive end multiplies an element value in a subsequence in the processed sequence by a corresponding element value in a subsequence in the original frequency offset estimation sequence, and the processed sequence is obtained after the delay of the length of K subsequences and the conjugation. In other words, the first element value in the first subsequence in the processed sequence is multiplied by the first element value in a $(K+1)^{th}$ subsequence in the original frequency offset estimation sequence; the second element value in the first subsequence in the processed sequence is multiplied by the second element value in a $K^{th}$ subsequence in the original frequency offset estimation sequence . . . . . The foregoing operation is repeated until an M$^{th}$ element value of a (N−K)$^{th}$ subsequence in the processed sequence is multiplied by an M$^{th}$ element value in an N$^{th}$ subsequence in the original frequency offset estimation sequence, so as to obtain (N−K)*M complex-number product values in total.

Step 104: The receive end calculates a sum of the (N−K)*M complex numbers.

Step 105: The receive end obtains a phase of the sum to obtain a phase value.

Figure 11:
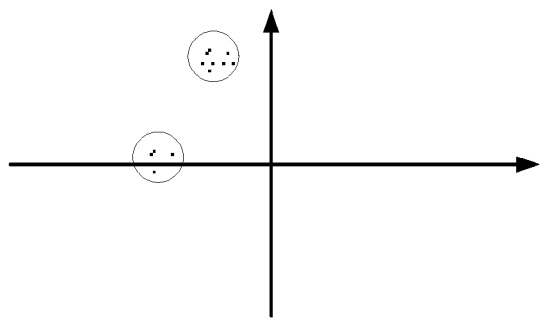
FIG. 11 is a schematic diagram of a principle of a reason why frequency offset estimation accuracy decreases in the prior art.

In the prior art, for the obtained (N−K)*M complex numbers, the receive end usually obtains a phase value and then calculates a sum. However, in this embodiment of the present invention, for the obtained (N−K)*M complex numbers, the receive end calculates a sum and then obtains a phase value. This decreases a quantity of phase collection operations, reduces calculation complexity, and further improves frequency offset estimation accuracy. FIG. 11 describes a reason why a prior-art method for averaging multiple phase values reduces frequency offset estimation accuracy. In a circle, there are (N−1)*M product values. The product values are located within a specific range because noise exists on a channel. If the range is limited in one quadrant, for example, in the second quadrant, it has less impact on accuracy of a phase value. If the range crosses two quadrants, for example, crosses the second and the third quadrant, a phase value is transited from π to −π. In this embodiment of the present invention, a sum of complex-number product values is calculated first, and a phase of the sum is obtained. Though a range in which the complex-number product values are located crosses two quadrants, good frequency offset estimation accuracy can be ensured.

Specially, when θ≠0, that is, when the frequency offset estimation sequence is a rotation sequence, before the receive end divides the phase value by M, the receive end needs to perform phase compensation on the phase value.

In this embodiment of the present invention, the receive end performs phase compensation on the phase value by using the following specific operation: rotating the phase value by a phase of φ. It can be learned from simulation that φ is related to θ, for example, φ is equal to π+θ, π−θ, or the like.

Step 106: The receive end divides the phase value by M to obtain a frequency offset estimation value.

Figure 12:
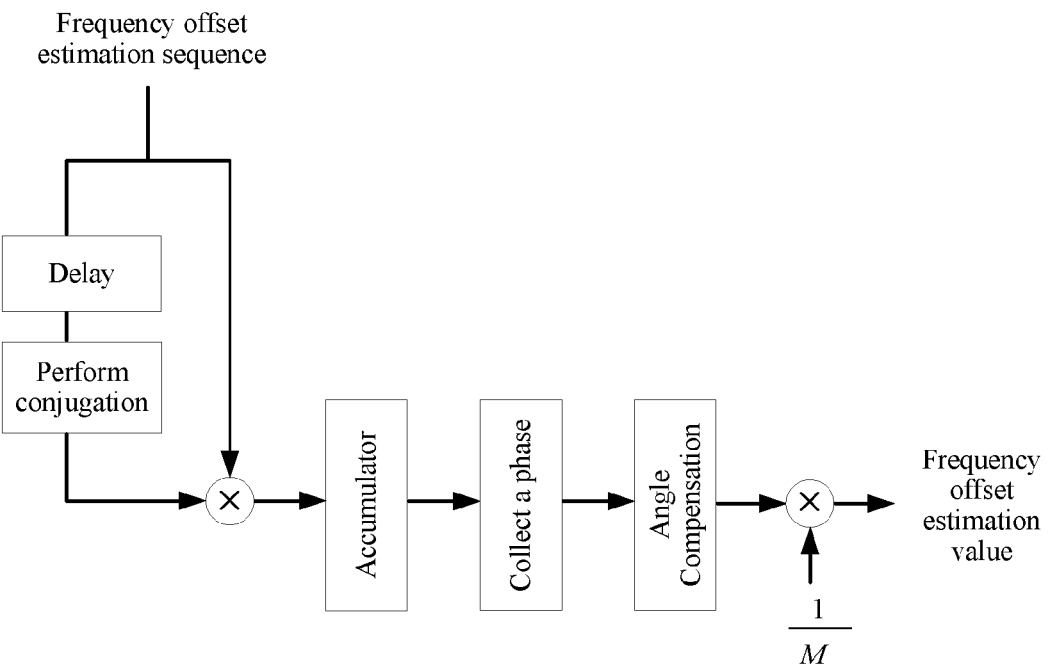
FIG. 12 is a schematic diagram of a procedure in which a receive end performs frequency offset estimation based on a rotation sequence according to an embodiment of the present invention.
Figure 13:
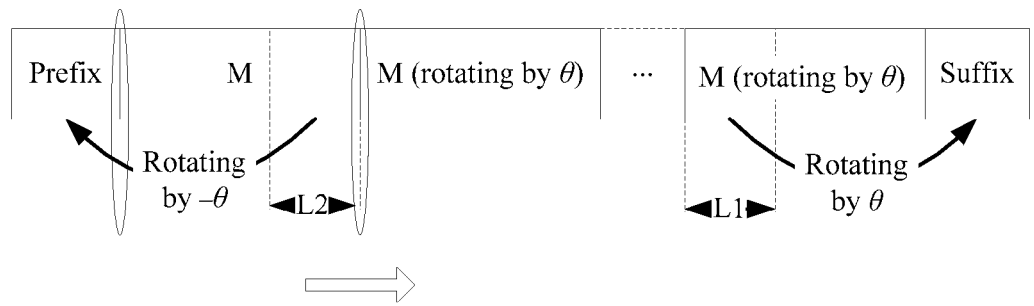
FIG. 13 is a schematic diagram of an operation process in which a receive end performs frequency offset estimation based on a rotation sequence according to an embodiment of the present invention.

As shown in FIG. 12, using K=1 as an example, a procedure that the receive end performs frequency offset estimation based on a rotation sequence is described as follows:

After finding a correct start location of the frequency offset estimation sequence, the receive end uses the correct start location to divide the frequency offset estimation sequence into two parts. One part is delayed by a length of one subsequence, then conjugated, and then input into a multiplier. The other part is directly input into the multiplier. FIG. 13 also describes the foregoing operation process. A left box indicates an element value that is directly input into a multiplier, and a right box indicates an element value that needs to be delayed, conjugated and then input into the multiplier. In addition, there is always a difference of M element values between the two element values that are input into the multiplication operation. One complex number may be obtained in each multiplication. The two boxes move rightwards simultaneously until the right box is moved to the last element value of the last sequence in the frequency offset estimation sequence. Finally, (N−1)*M complex numbers may be obtained in total. Considering that for a complex number, a phase obtained by calculating a sum and a phase obtained by obtaining a phase are the same, to reduce calculation complexity, the receive end calculates a sum of the obtained (N−1)*M complex numbers, and then obtains a phase of the only one sum value. After obtaining a phase difference of M element values in the frequency offset estimation sequence, the receive end performs phase compensation on the phase difference, and divides a phase value obtained after compensation by M to obtain the frequency offset estimation value.

In the foregoing embodiment, a prefix and a suffix are added to improve anti-multipath interference performance at start and end locations of a frequency offset estimation sequence. A receive end multiples the original frequency offset estimation sequence by a frequency offset estimation sequence obtained after delay and conjugation, calculates a sum of obtained multiple complex-number product values, and then obtains a phase of the sum. This greatly decreases a quantity of phase collection operations, reduces calculation complexity, and ensures good frequency offset estimation accuracy.

Figure 14:
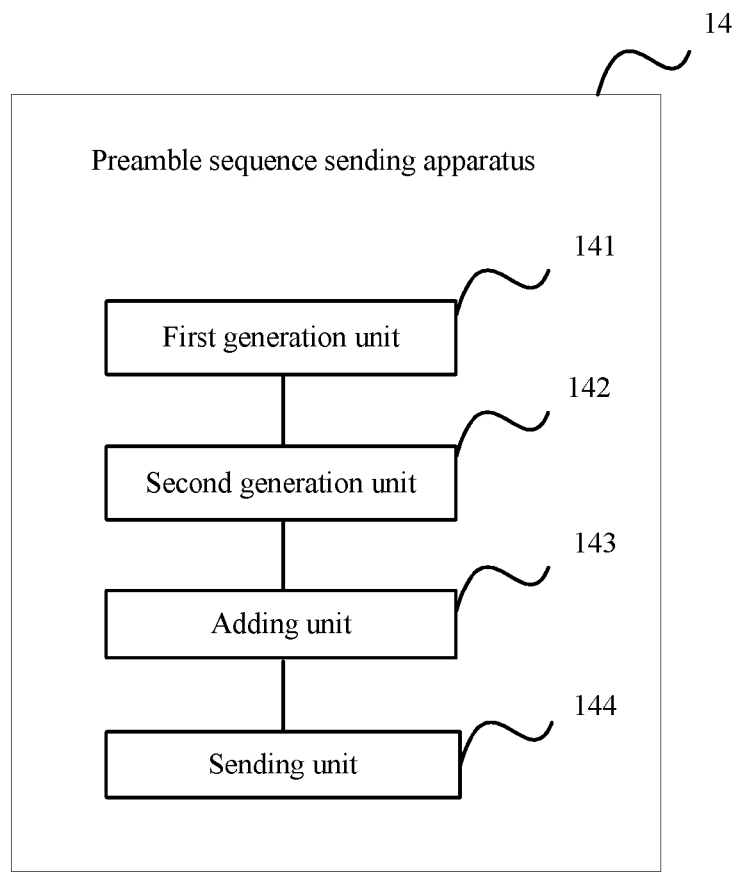
FIG. 14 is a structural diagram of a preamble sequence sending apparatus according to an embodiment of the present invention.

As shown in FIG. 14, an embodiment of the present invention provides a preamble sequence sending apparatus 14 that is configured to implement the preamble sequence sending method shown in FIG. 4 in the present invention. The preamble sequence sending apparatus 14 includes:

a first generation unit 141, configured to generate a frequency offset estimation sequence, where the frequency offset estimation sequence includes N subsequences each with a length of M, N is a positive integer greater than or equal to 2, and M is a positive integer;

a second generation unit 142, configured to generate a prefix and a suffix based on the frequency offset estimation sequence;

an adding unit 143, configured to add the prefix and the suffix before and after the frequency offset estimation sequence respectively to form a preamble sequence, where the prefix and the suffix are used for canceling multipath interference; and a sending unit 144, configured to add the preamble sequence to a data packet and send the data packet to a receive end.

Further, the first generation unit 141 is specifically configured to generate a bit stream; modulate the bit stream to a preset data modulation format, where the bit stream is used as a basic subsequence, and a length of the basic subsequence is M; replicate the basic subsequence to obtain a long sequence including N basic subsequences; and rotate each subsequence included in the long sequence by a phase of θ relative to a previous subsequence adjacent to the subsequence, to obtain the frequency offset estimation sequence, where −π≤θ≤π.

Further, the second generation unit 142 is specifically configured to replicate last L1 element values included in the first subsequence of the frequency offset estimation sequence, and separately rotate the replicated L1 element values by a phase of −θ to generate the prefix; and replicate first L2 element values included in the last subsequence of the frequency offset estimation sequence, and separately rotate the replicated L2 element values by a phase of θ to generate the suffix, where L1 and L2 are set by the second generation unit 142 according to a channel multipath feature, and L1 and L2 are integers not greater than M.

Further, the adding unit 143 is specifically configured to add the prefix before the first subsequence of the frequency offset estimation sequence and add the suffix after the last subsequence of the frequency offset estimation sequence.

Figure 15:
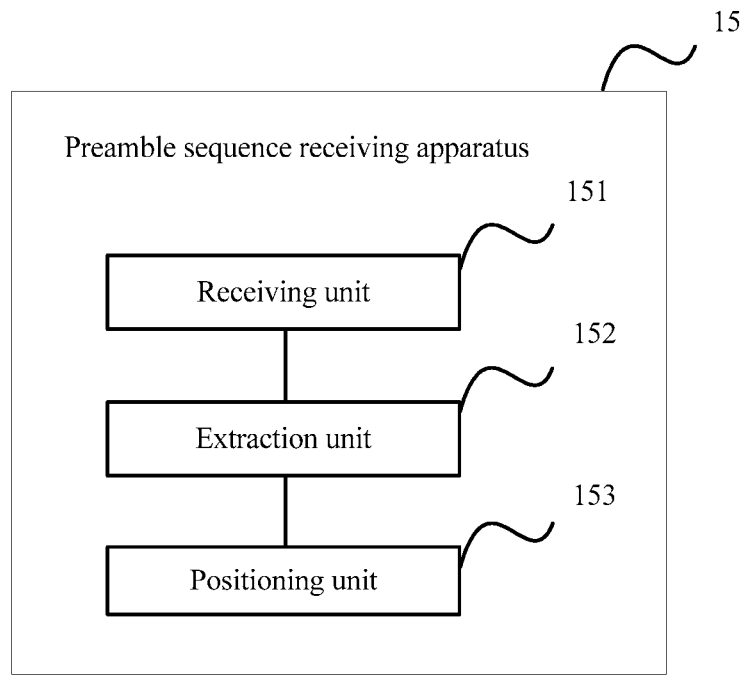
FIG. 15 is a structural diagram of a preamble sequence receiving apparatus according to an embodiment of the present invention.

As shown in FIG. 15, an embodiment of the present invention provides a preamble sequence receiving apparatus 15 that is configured to implement the preamble sequence receiving method shown in FIG. 9 in the present invention. The preamble sequence receiving apparatus 15 includes:

a receiving unit 151, configured to receive a data packet;

an extraction unit 152, configured to extract a preamble sequence from the data packet, where the preamble sequence includes a prefix, a frequency offset estimation sequence, and a suffix in order, the prefix and the suffix are used for canceling multipath interference, the frequency offset estimation sequence includes N subsequences each with a length of M, N is a positive integer greater than or equal to 2, and M is a positive integer; and a positioning unit 153, configured to find the frequency offset estimation sequence in the preamble sequence according to a length of the prefix.

Optionally, each subsequence included in the frequency offset estimation sequence is rotated by a phase of θ relative to a previous subsequence adjacent to the subsequence, where −≤θ≤π.

The preamble sequence receiving apparatus 15 may further include:

a frequency offset estimation unit, configured to delay each subsequence included in the frequency offset estimation sequence by a length of K subsequences to obtain a new sequence, where K is a positive integer less than N; perform conjugation on the new sequence to obtain a processing sequence; multiply an element value in a subsequence in the processed sequence by a corresponding element value in a subsequence in the frequency offset estimation sequence to obtain (N−K)*M complex numbers; calculate a sum of the (N−K)*M complex numbers; obtain a phase of the sum to obtain a phase value; and divide the phase value by M to obtain a frequency offset estimation value.

The preamble sequence receiving apparatus 15 may further include:

a phase compensation unit, configured to: when θ≠0, before the frequency offset estimation unit divides the phase value by M, perform phase compensation on the phase value.

The phase compensation unit is specifically configured to rotate the phase value by a phase of φ, where φ is related to θ.

Figure 16:
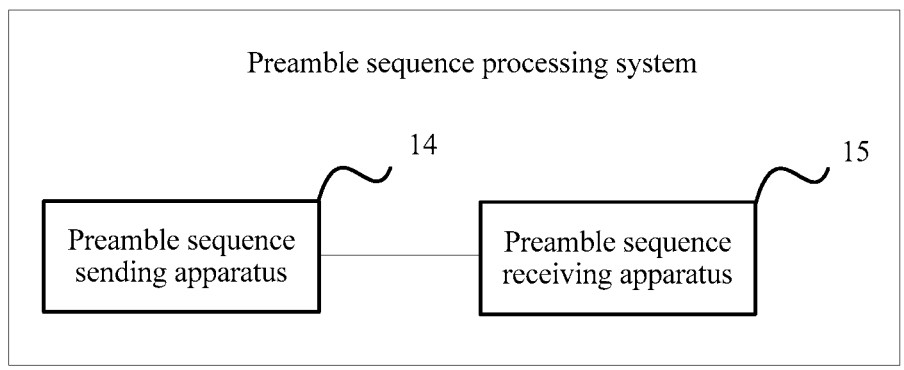
FIG. 16 is a structural diagram of a preamble sequence processing system according to an embodiment of the present invention.

As shown in FIG. 16, an embodiment of the present invention further provides a preamble sequence processing system, and the system may include the sending apparatus 14 in any one of the foregoing cases and the receiving apparatus 15 in any one of the foregoing cases. The sending apparatus 14 is connected to the receiving apparatus 15.

The sending apparatus 14 configured to generate a frequency offset estimation sequence, where the frequency offset estimation sequence includes N subsequences each with a length of M, N is a positive integer greater than or equal to 2, and M is a positive integer; generate a prefix and a suffix based on the frequency offset estimation sequence; add the prefix and the suffix before and after the frequency offset estimation sequence respectively to form a preamble sequence, where the prefix and the suffix are used for canceling multipath interference; and add the preamble sequence to a data packet and send the data packet to a receive end.

The receiving apparatus 15 is configured to receive the data packet; extract the preamble sequence from the data packet, where the preamble sequence includes the prefix, the frequency offset estimation sequence, and the suffix in order, the prefix and the suffix are used for canceling multipath interference, the frequency offset estimation sequence includes N subsequences each with a length of M, N is a positive integer greater than or equal to 2, and M is a positive integer; and find the frequency offset estimation sequence from the preamble sequence according to the length of the prefix.

Further, the sending apparatus 14 is specifically configured to generate a bit stream; modulate the bit stream to a preset data modulation format, where the bit stream is used as a basic subsequence, and a length of the basic subsequence is M; replicate the basic subsequence to obtain a long sequence including N basic subsequences; and rotate each subsequence included in the long sequence by a phase of θ relative to a previous subsequence adjacent to the subsequence, to obtain the frequency offset estimation sequence, where −π≤θ≤π.

Further, the sending apparatus 14 is specifically configured to replicate last L1 element values included in the first subsequence of the frequency offset estimation sequence, and separately rotate the replicated L1 element values by a phase of −θ to generate the prefix; and replicate first L2 element values included in the last subsequence of the frequency offset estimation sequence, and separately rotate the replicated L2 element values by a phase of θ to generate the suffix, where L1 and L2 are set by the sending apparatus 14 according to a channel multipath feature, and L1 and L2 are integers not greater than M.

Further, the sending apparatus 14 is specifically configured to add the prefix before the first subsequence of the frequency offset estimation sequence and add the suffix after the last subsequence of the frequency offset estimation sequence.

Optionally, each subsequence included in the frequency offset estimation sequence extracted by the receiving apparatus 15 is rotated by a phase of θ relative to a previous subsequence adjacent to the subsequence, where −π≤θ≤π.

Further, the receiving apparatus 15 may be further configured to delay each subsequence included in the frequency offset estimation sequence by a length of K subsequences to obtain a new sequence, where K is a positive integer less than N; perform conjugation on the new sequence to obtain a processing sequence; multiply an element value in a subsequence in a processed sequence by a corresponding element value in a subsequence in the frequency offset estimation sequence to obtain (N−K)*M complex numbers; calculate a sum of the (N−K)*M complex numbers; obtain a phase of the sum to obtain a phase value; and divide the phase value by M to obtain a frequency offset estimation value.

Further, the receiving apparatus 15 may be further configured to: when θ≠0, before the phase value is divided by M, perform phase compensation on the phase value.

Further, when performing phase compensation on the phase value, the receiving apparatus 15 is specifically configured to rotate the phase value by a phase of φ, where φ is related to θ.

In conclusion, the technical solutions provided in the embodiments of the present invention are applicable to a DOCSIS single carrier modulation system. A prefix and a suffix are added to a frequency offset estimation sequence at a transmit end, so as to improve performance of anti-multipath interference of the frequency offset estimation sequence. The frequency offset estimation sequence may be a cycle sequence or a rotation sequence. Specially, when the frequency offset estimation sequence is a rotation sequence, an estimation range of a frequency offset may be freely adjusted, and the rotation sequence has a wider estimation range and higher estimation accuracy. A receive end may perform more accurate frequency offset estimation based on the received frequency offset estimation sequence. The receive end multiples the original frequency offset estimation sequence by a frequency offset estimation sequence obtained after delay and conjugation, calculates a sum of obtained multiple complex-number product values, and then obtains a phase of the sum. This greatly decreases a quantity of phase collection operations, reduces calculation complexity, and ensures good frequency offset estimation accuracy.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A preamble sequence sending method, comprising:
generating, by a transmit end, a frequency offset estimation sequence, wherein the frequency offset estimation sequence comprises N subsequences each with a length of M, wherein N is a positive integer greater than or equal to 2, and M is a positive integer;
generating, by the transmit end, a prefix and a suffix based on the frequency offset estimation sequence;
adding, by the transmit end, the prefix and the suffix before and after the frequency offset estimation sequence, respectively, to form a preamble sequence, wherein the prefix and the suffix are used for canceling multipath interference, wherein each subsequence comprised in the frequency offset estimation sequence is rotated by a phase of $\theta$ relative to a previous subsequence adjacent to the subsequence, and $-\pi \leq \theta \leq \pi$; and
adding, by the transmit end, the preamble sequence to a data packet and sending the data packet to a receive end,
wherein the generating, by the transmit end, the frequency offset estimation sequence comprises:
generating, by the transmit end, a bit stream;
modulating, by the transmit end, the bit stream to a preset data modulation format, wherein the modulated bit stream is used as a basic subsequence, and a length of the basic subsequence is M;
replicating, by the transmit end, the basic subsequence to obtain a long sequence comprising N basic subsequences; and
rotating, by the transmit end, each subsequence comprised in the long sequence by the phase of $\theta$ relative to the previous subsequence adjacent to the subsequence, to obtain the frequency offset estimation sequence.

2. A preamble sequence sending method, comprising:
generating, by a transmit end, a frequency offset estimation sequence, wherein the frequency offset estimation sequence comprises N subsequences each with a length of M, wherein N is a positive integer greater than or equal to 2, and M is a positive integer;
generating, by the transmit end, a prefix and a suffix based on the frequency offset estimation sequence;
adding, by the transmit end, the prefix and the suffix before and after the frequency offset estimation sequence, respectively, to form a preamble sequence, wherein the prefix and the suffix are used for canceling multipath interference, wherein each subsequence comprised in the frequency offset estimation sequence is rotated by a phase of $\theta$ relative to a previous subsequence adjacent to the subsequence, and $-\pi \leq \theta \leq \pi$; and
adding, by the transmit end, the preamble sequence to a data packet and sending the data packet to a receive end,
wherein the generating, by the transmit end, a prefix and a suffix based on the frequency offset estimation sequence comprises:
replicating, by the transmit end, a last L1 element values comprised in the first subsequence of the frequency offset estimation sequence, and separately rotating the replicated L1 element values by a phase of $-\theta$ to generate the prefix; and replicating, by the transmit end, a first L2 element values comprised in the last subsequence of the frequency offset estimation sequence, and separately rotating the replicated L2 element values by the phase of θ to generate the suffix;

wherein L1 and L2 are set by the transmit end according to a channel multipath feature, and L1 and L2 are integers not greater than M.

3. The method according to claim 2, wherein the adding, by the transmit end, the prefix and the suffix before and after the frequency offset estimation sequence, respectively, comprises:

adding, by the transmit end, the prefix before the first subsequence of the N subsequences of the frequency offset estimation sequence; and adding, by the transmit end, the suffix after the last subsequence of the N subsequences of the frequency offset estimation sequence.

4. A preamble sequence receiving method, comprising:
receiving, by a receive end, a data packet;
extracting, by the receive end, a preamble sequence from the data packet, wherein the preamble sequence comprises a prefix, a frequency offset estimation sequence, and a suffix in order, the prefix and the suffix are used for canceling multipath interference, the frequency offset estimation sequence comprises N subsequences each with a length of M, wherein N is a positive integer greater than or equal to 2, and M is a positive integer, wherein each subsequence comprised in the frequency offset estimation sequence is rotated by a phase of θ relative to a previous subsequence adjacent to the subsequence, and $-\pi \leq \theta \leq \pi$;

finding, by the receive end, the frequency offset estimation sequence in the preamble sequence according to a length of the prefix;

delaying, by the receive end, each subsequence comprised in the frequency offset estimation sequence by a length of K subsequences to obtain a new sequence, wherein K is a positive integer less than N;

performing, by the receive end, conjugation on the new sequence to obtain a processed sequence;

multiplying, by the receive end, an element value in a subsequence in the processed sequence by a corresponding element value in a subsequence in the frequency offset estimation sequence to obtain (N−K)*M complex numbers;

calculating, by the receive end, a sum of the (N−K)*M complex numbers;

obtaining, by the receive end, a phase of the sum to obtain a phase value; and dividing, by the receive end, the phase value by M to obtain a frequency offset estimation value.

5. The method according to claim 4 wherein when θ≠0, before the dividing, by the receive end, the phase value by M, the receive end performs phase compensation on the phase value.

6. The method according to claim 5, wherein the performing, by the receive end, phase compensation on the phase value comprises:

rotating, by the receive end, the phase value by a phase of φ, wherein φ is related to θ.

7. A preamble sequence sending apparatus, comprising:
a first generation unit, configured to generate a frequency offset estimation sequence, wherein the frequency offset estimation sequence comprises N subsequences each with a length of M, wherein N is a positive integer greater than or equal to 2, and M is a positive integer, wherein each subsequence comprised in the frequency offset estimation sequence is rotated by a phase of θ relative to a previous subsequence adjacent to the subsequence, and $-\pi \leq \theta \leq \pi$;

a second generation unit, configured to generate a prefix and a suffix based on the frequency offset estimation sequence;

an adding unit, configured to add the prefix and the suffix before and after the frequency offset estimation sequence, respectively, to form a preamble sequence, wherein the prefix and the suffix are used for canceling multipath interference; and a sending unit, configured to add the preamble sequence to a data packet and send the data packet to a receive end, wherein the first generation unit is configured to:
generate a bit stream;
modulate the bit stream to a preset data modulation format, wherein the modulated bit stream is used as a basic subsequence, and a length of the basic subsequence is M;
replicate the basic subsequence to obtain a long sequence comprising N basic subsequences; and
rotate each subsequence comprised in the long sequence by the phase of θ relative to the previous subsequence adjacent to the subsequence, to obtain the frequency offset estimation sequence.

8. A preamble sequence sending apparatus, comprising:
a first generation unit, configured to generate a frequency offset estimation sequence, wherein the frequency offset estimation sequence comprises N subsequences each with a length of M, wherein N is a positive integer greater than or equal to 2, and M is a positive integer, wherein each subsequence comprised in the frequency offset estimation sequence is rotated by a phase of θ relative to a previous subsequence adjacent to the subsequence, and $-\pi \leq \theta \leq \pi$;

a second generation unit, configured to generate a prefix and a suffix based on the frequency offset estimation sequence;

an adding unit, configured to add the prefix and the suffix before and after the frequency offset estimation sequence, respectively, to form a preamble sequence, wherein the prefix and the suffix are used for canceling multipath interference; and a sending unit, configured to add the preamble sequence to a data packet and send the data packet to a receive end, wherein the second generation unit is configured to:
replicate a last L1 element values comprised in the first subsequence of the frequency offset estimation sequence, and separately rotate the replicated L1 element values by a phase of −θ to generate the prefix; and replicate a first L2 element values comprised in the last subsequence of the frequency offset estimation sequence, and separately rotate the replicated L2 element values by the phase of θ to generate the suffix;

wherein L1 and L2 are set by the second generation unit according to a channel multipath feature, and L1 and L2 are integers not greater than M.

9. The sending apparatus according to claim 8, wherein the adding unit is configured to:
add the prefix before the first subsequence of the N subsequences of the frequency offset estimation sequence; and
add the suffix after the last subsequence of the N subsequences of the frequency offset estimation sequence.

10. A preamble sequence receiving apparatus, comprising:
- a receiving unit, configured to receive a data packet;
- an extraction unit, configured to extract a preamble sequence from the data packet, wherein the preamble sequence comprises a prefix, a frequency offset estimation sequence, and a suffix in order, the prefix and the suffix are used for canceling multipath interference, the frequency offset estimation sequence comprises N subsequences each with a length of M, wherein N is a positive integer greater than or equal to 2, and M is a positive integer, wherein each subsequence comprised in the frequency offset estimation sequence is rotated by a phase of θ relative to a previous subsequence adjacent to the subsequence, and $-\pi \leq \theta \leq \pi$;
- a positioning unit, configured to find the frequency offset estimation sequence in the preamble sequence according to a length of the prefix; and
- a frequency offset estimation unit, configured to:
    - delay each subsequence comprised in the frequency offset estimation sequence by a length of K subsequences to obtain a new sequence, wherein K is a positive integer less than N;
    - perform conjugation on the new sequence to obtain a processing sequence;
    - multiply an element value in a subsequence in the processed sequence by a corresponding element value in a subsequence in the frequency offset estimation sequence to obtain (N−K)*M complex numbers;
    - calculate a sum of the (N−K)*M complex numbers;
    - obtain a phase of the sum to obtain a phase value; and
    - divide the phase value by M to obtain a frequency offset estimation value.

11. The receiving apparatus according to claim 10, wherein the apparatus further comprises:
- a phase compensation unit, configured to: when θ≠0, before the frequency offset estimation unit divides the phase value by M, perform phase compensation on the phase value.

* * * * *